(No Model.)
W. C. DAVIS.
AMALGAM FOR FILLING TEETH.
No. 307,921. Patented Nov. 11, 1884.
WITNESSES:
INVENTOR:
ATTORNEYS.

UNITED STATES PATENT OFFICE.

WALTER CHARLES DAVIS, OF ST. PETERSBURG PLACE, BAYSWATER, COUNTY OF MIDDLESEX, ENGLAND.

AMALGAM FOR FILLING TEETH.

SPECIFICATION forming part of Letters Patent No. 307,921, dated November 11, 1884.

Application filed March 19, 1884. (No model.) Patented in England January 25, 1884, No. 2,137.

*To all whom it may concern:*

Be it known that I, WALTER CHARLES DAVIS, of St. Petersburg Place, Bayswater, in the county of Middlesex, England, have invented new and useful Improvements in the Manufacture of Amalgam for Tooth-Stopping for the Use of Dentists, of which the following is a full, clear, and exact description.

The figure shows an enlarged sectional view of a particle or filing of amalgam, provided with the coating of varnish and gold.

The object of my invention is to provide a new and improved amalgam for filling teeth.

My method of preparing the filling is as follows: I take the amalgam filings, such as are commonly used by dentists in making fillings for hollow teeth, and wash or immerse them in a gum varnish containing gold-dust. The effect of this is that each individual filing or grain is hermetically inclosed in a coating that protects it from the oxidizing action of the atmosphere and imparts a gold color to the several grains, which makes a very desirable filling, as the fillings now commonly used soon turn black.

In order to use the filings thus coated they are mixed, coating and all, with mercury in the usual way, the gold assisting the amalgamation till they form a plastic mass, when they are ready for use. The addition of the gold-coating to the individual filings of amalgam enables the tooth stopping or filling made from them to better resist the action of the acid secretions of the mouth.

What I claim as my invention, and desire to secure by Letters Patent, is—

1. The method herein described for treating amalgam filings, which consists in coating each individual grain or particle with a varnish of gum and gold-dust, substantially as set forth.

2. The filling for teeth herein described, consisting of amalgam filings, each individual grain or particle of which is provided with a coating of varnish and gold, whereby the said filings are protected from the action of the atmosphere and the acid secretions of the mouth, substantially as set forth.

Signed by me this 22d day of February, 1884.

WALTER CHARLES DAVIS. [L. S.]

Witnesses:
    W. G. PARRY,
*Solicitor, Bristol Chambers, Nicholas Street, Bristol.*
    HARRY CLIFTON,
*Clerk to Messrs. Plummer & Parry, Solicitors, Bristol.*